(12) United States Patent
Gaudette et al.

(10) Patent No.: US 7,854,260 B2
(45) Date of Patent: Dec. 21, 2010

(54) STEAM DRIVEN TURBINE DRIVE

(75) Inventors: Sean L. Gaudette, Katy, TX (US);
Bennett M. Richard, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 234 days.

(21) Appl. No.: 12/176,527

(22) Filed: Jul. 21, 2008

(65) Prior Publication Data

US 2010/0011767 A1 Jan. 21, 2010

(51) Int. Cl.
*E21B 43/24* (2006.01)

(52) U.S. Cl. ............ 166/262; 166/62; 166/105; 416/20 R

(58) Field of Classification Search ........ 166/262, 166/58, 62, 63, 68, 105; 415/83, 109; 416/20 R, 416/21; 60/258, 257, 200.1
See application file for complete search history.

(56) References Cited

U.S. PATENT DOCUMENTS

| 3,036,645 | A | * | 5/1962 | Rowley | ............... 175/93 |
|---|---|---|---|---|---|
| 3,237,400 | A | * | 3/1966 | Kuhrt | ............... 60/246 |
| 3,905,196 | A | * | 9/1975 | Govindarajan et al. | ..... 60/641.4 |
| 3,982,591 | A | | 9/1976 | Hamrick et al. | |
| 4,421,163 | A | | 12/1983 | Tuttle | |
| 4,682,471 | A | | 7/1987 | Wagner | |
| 5,052,482 | A | | 10/1991 | Goudouin | |
| 2006/0113803 | A1 | * | 6/2006 | Hall et al. | ............... 290/54 |
| 2008/0047753 | A1 | * | 2/2008 | Hall et al. | ............... 175/57 |

OTHER PUBLICATIONS

Precision Combustion, Inc., "PCI Developing Downhole Catalytic Combustor Steam Generator for Heavy Oil Production", www.precision-combustion.com; North Haven, CT, May 2, 2006; pp. 1-2.
Nina Morgan, "Instant Steam Feature Article", Oxford Catalysts Group PLC; www.oxfordcatalysts.com; Jul. 30, 2007; pp. 1-3.
Carolyne M. Hart, "A Comparative Evaluation of Surface and Downhole Steam Generation Techniques", SPE Enhanced Oil Recovery Symposium, Apr. 4-7, 1982, Tulsa, Oklahoma; pp. 1-2.

* cited by examiner

*Primary Examiner*—Kenneth Thompson
(74) *Attorney, Agent, or Firm*—Cantor Colburn LLP

(57) ABSTRACT

A downhole arrangement including an outer housing, an inner housing disposed within the outer housing and defining with the outer housing a chamber, a turbine disposed within the chamber, and one or more nozzles disposed at the chamber capable of exhausting steam into the chamber. A method for moving a target fluid within a wellbore.

12 Claims, 2 Drawing Sheets

STEAM DRIVEN TURBINE DRIVE

The ability to affect fluids in the downhole environment is both a necessary part of hydrocarbon production and a source of consternation in some applications due to inherent difficulty in creating the desired effect. In some cases, work is performed on the fluid from remote locations while in other cases, work is performed on the fluid locally. Where work is performed locally, there are added difficulties to overcome such as providing power to whatever device is doing the work, etc. In some situations, such difficulties are overcome and the operation goes forward without significant difficulty with a particular set of tools and/or components and/or processes. The same paradigm however may not work well for another wellbore or even for another section of the same wellbore. Therefore, the art is always receptive to new arrangements and methods for doing "work" on a fluid in the downhole environment.

SUMMARY

A downhole arrangement including an outer housing, an inner housing disposed within the outer housing and defining with the outer housing a chamber, a turbine disposed within the chamber, and one or more nozzles disposed at the chamber capable of exhausting steam into the chamber.

A method for moving a target fluid within a wellbore including supplying a reactant fuel to a catalyst nozzle in a downhole arrangement and exhausting a resultant steam through a turbine.

BRIEF DESCRIPTION OF THE DRAWINGS

Referring now to the drawings wherein like elements are numbered alike in the several Figures.

DETAILED DESCRIPTION

Figure 1:
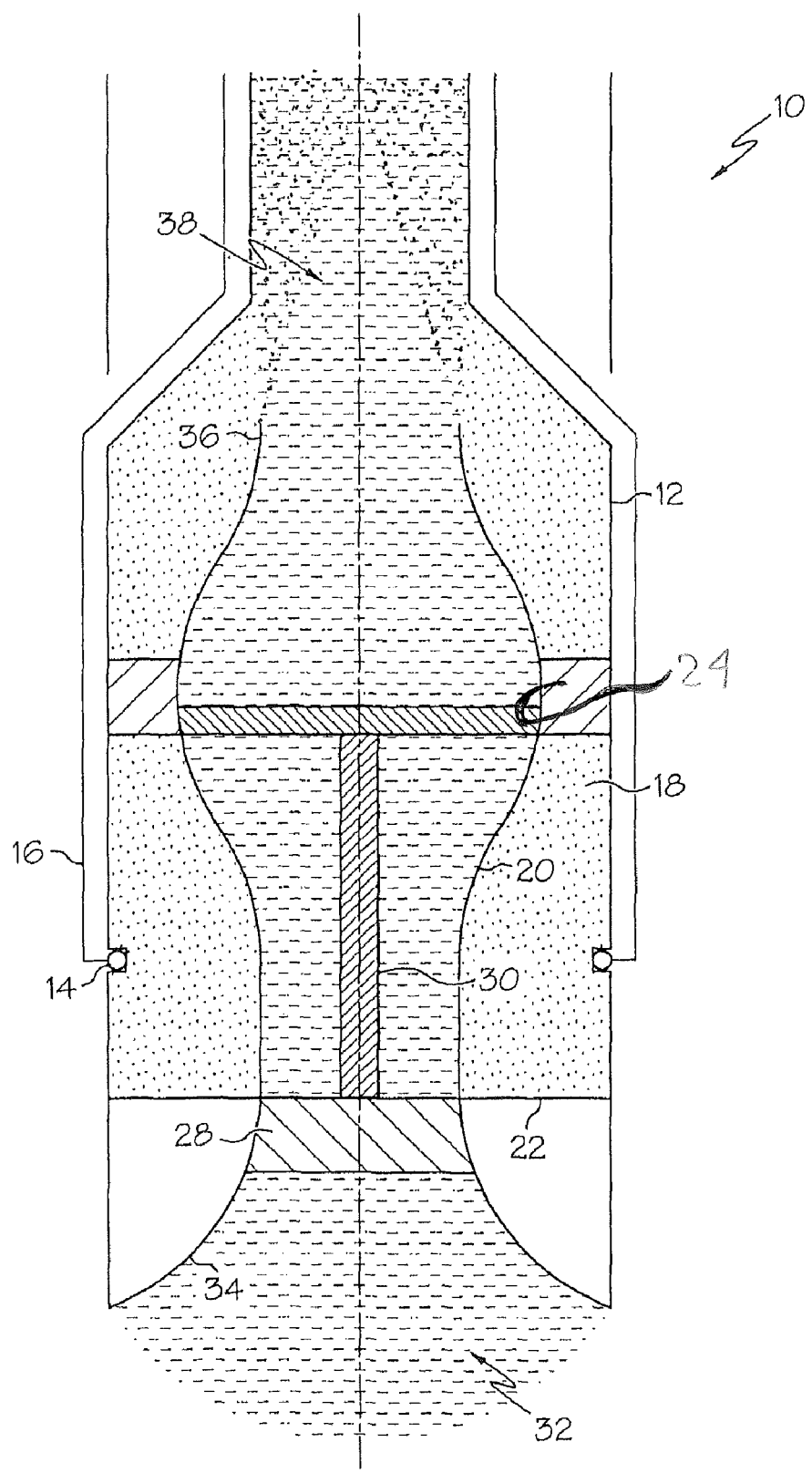
FIG. 1 is a schematic view of a steam turbine driven configuration in accordance with the disclosure hereof.

Referring to FIG. 1, an arrangement 10 is illustrated that facilitates the application of work to a fluid in the downhole environment. The arrangement 10 includes an outer housing 12. The housing 12 supports one or more catalyst nozzles 14 that are fluidly connected to a reactant fuel source through one or more conduits 16, which may comprise commonly used control line.

The catalyst that is provided within the nozzle 14 is a powdered precious metal-based catalyst (available from Oxford Catalysts Group PLC trading under Oxford Catalysts Limited, 115e Milton Park, Oxford, OX14 4RZ, UK). The reactant fuel (e.g. aqueous methanol and hydrogen peroxide) is supplied to the catalyst through the conduit(s) 16 as noted whereby an exothermic reaction takes place. The reaction produces water, carbon dioxide and heat thereby generating steam at a selected temperature up to about 1500° F. and at atmospheric pressure. The pressure with which the steam is applied to an end target can be adjusted by increasing or decreasing the pressure of the reactant fuel mixture supplied to the catalyst.

Nozzles 14 are directed to exhaust steam to a chamber 18 that is defined at an outside surface by housing 12 and at an inside surface by an inner housing 20. In this embodiment, a downhole end of the chamber 18 is closed by closure member 22, which ensures that all steam created by fuel passing through the nozzles 14 will act upon a turbine 24 that is rotatably supported between the housing 12 and the housing 20. Expanding steam through a plurality of vanes of the turbine allows the turbine to extract energy from the steam and put is to useable work. In this iteration of the arrangement 10 the energy is used to drive a pump.

In the illustrated embodiment, a pump impeller 28 (the pump) is drivingly connected to the turbine 24 by a shaft 30. The impeller 28 thereby spins with the turbine causing a target fluid 32 to move through an inlet 34 of the inner housing toward a directed destination.

While the arrangement 10 will function to move the target fluid 32 toward a desired destination as has been disclosed, the movement of the fluid can be augmented within the operation of the arrangement 10. More specifically, a review of FIG. 1, will make clear that the inner housing 20 ends at a downstream end 36 of inner housing 20 that is still within a volume defined by the outer housing 12. Steam that has passed through the turbine 24 will consequently mix with the target fluid 32 downstream of the end 36, in zone 38. Those of skill in the art will recognize such a condition to be a gas lift condition as the steam will reduce the density of the target fluid 32 making it easier for the fluid to move to a surface or other location.

Figure 2:
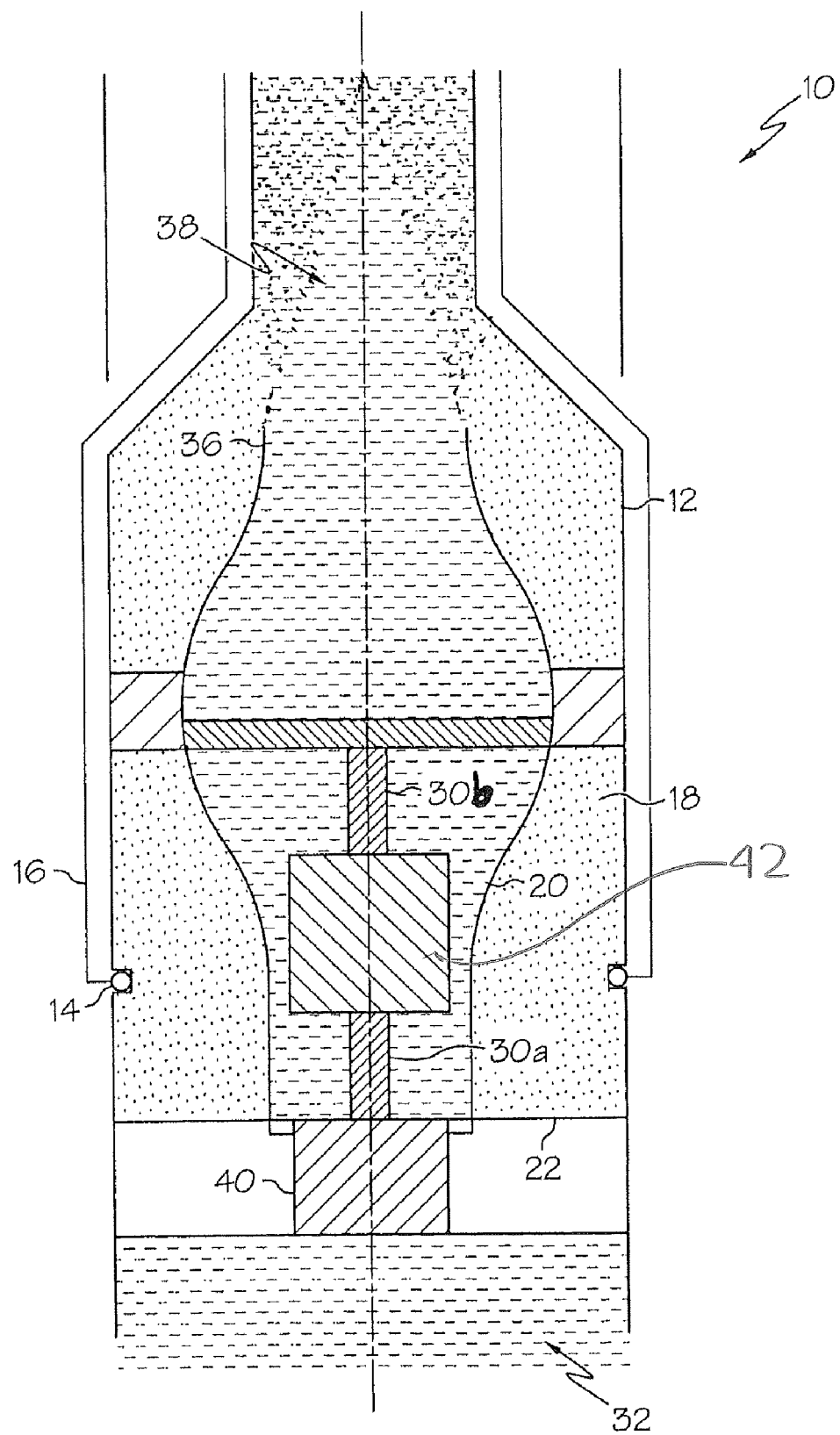
FIG. 2 is a schematic view of another steam turbine driven configuration in accordance with the disclosure hereof.

In another embodiment of the arrangement 10, referring to FIG. 2, a positive displacement pump 40 is substituted for the action of the impeller 28 and a gear reducer 42 is added between the turbine 24 and the pump 40 in order to ensure that sufficient torque is available to drive the pump 40. This of course requires that shaft 30 be bifurcated to a primary shaft 30a and a secondary shaft 30b. In other respects, the embodiment of FIG. 2 operates as does that of FIG. 1.

In operation, the arrangement 10 is run into the downhole environment and at least an inlet 34 of the arrangement 10 into contact with a target fluid 32. Fuel can then be supplied at any time to begin the steam generation process. Once the fuel is brought into contact with the one or more nozzles 14, the catalyst in the nozzles 14 will react with the fuel to produce steam at a selected temperature and pressure. The steam will naturally be directed through the turbine from the chamber 18 thereby spinning the turbine. The energy extracted by the turbine from the steam may be applied as is desired. In the illustrated embodiments hereof, the use is to activate a pump. In no way is it intended that the concept be limited to pumps however as the extracted energy can be used for other devices.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole arrangement comprising:
   an outer housing;
   an inner housing disposed within the outer housing and defining with the outer housing a chamber;
   a turbine disposed within the chamber; and
   one or more nozzles disposed at the chamber capable of exhausting steam into the chamber, the one or more nozzles being connected to one or more fuel supply lines, the one or more lines capable of supplying a reactant fuel that when exposed to a catalyst within the one or more nozzles produces steam.

2. The arrangement as claimed in claim 1 further comprising a pump drivingly connected to the turbine.

3. The arrangement as claimed in claim 2 wherein the pump is an impeller.

4. The arrangement as claimed in claim 2 wherein the pump is a positive displacement pump.

5. The arrangement as claimed in claim 4 wherein the arrangement further includes a gear reducer disposed between the turbine and the positive displacement pump.

6. The arrangement as claimed in claim 1 wherein the chamber is fluidly closed except for the turbine.

7. The arrangement as claimed in claim 1 wherein the outer housing comprises a mixing zone for steam and fluid moving through the inner housing.

8. A downhole arrangement comprising:

an outer housing;

an inner housing disposed within the outer housing and defining with the outer housing a chamber;

a turbine disposed within the chamber; and one or more nozzles disposed at the chamber capable of exhausting steam into the chamber, the arrangement further lifting a target fluid by density reduction.

9. A method for moving a target fluid within a wellbore comprising:

supplying a reactant fuel to a the downhole arrangement as claimed in claim 1;

exhausting a resultant steam through a turbine.

10. The method as claimed in claim 9 further comprising:

driving an auxiliary device with the turbine.

11. The method as claimed in claim 9 further comprising:

driving a pump; and pumping a target fluid.

12. The method as claimed in claim 9 further comprising:

mixing the steam with a target fluid to reduce a density thereof.

* * * * *